United States Patent [19]

Bodin et al.

[11] Patent Number: 5,241,685
[45] Date of Patent: Aug. 31, 1993

[54] LOAD SHARING CONTROL FOR A MOBILE CELLULAR RADIO SYSTEM

[75] Inventors: Roland Bodin, Spanga; Arne Norefors, Stockholm, both of Sweden

[73] Assignee: Telefonaktiebolaget L M Ericsson, Stockholm, Sweden

[21] Appl. No.: 669,865

[22] Filed: Mar. 15, 1991

[51] Int. Cl.$^5$ .............................................. H04Q 7/00
[52] U.S. Cl. .................................. 455/33.2; 455/54.2; 455/56.1; 455/67.1; 379/60
[58] Field of Search ................ 455/33.1, 33.2, 54.1, 455/54.2, 56.1, 67.1; 379/59, 60

[56] References Cited

U.S. PATENT DOCUMENTS

| | | | |
|---|---|---|---|
| 4,144,412 | 3/1979 | Ito et al. | 455/34.2 |
| 4,435,840 | 3/1984 | Kosima et al. | 455/33.4 |
| 4,551,852 | 11/1985 | Grauel et al. | 455/33 |
| 4,573,206 | 2/1986 | Grauel et al. | 455/33 |
| 4,669,107 | 5/1987 | Eriksson-Lennartsson | 455/33.4 |
| 4,670,899 | 6/1987 | Brody et al. | 455/56.1 |
| 4,736,453 | 4/1988 | Schloemer | 455/33 |
| 4,876,738 | 10/1989 | Selby | 455/33 |
| 4,887,265 | 12/1989 | Felix | 370/59 |

FOREIGN PATENT DOCUMENTS 2659569 5/1978 Fed. Rep. of Germany.
2-69027 3/1990 Japan.

Primary Examiner—Reinhard J. Eisenzopf
Assistant Examiner—Timothy H. Keough
Attorney, Agent, or Firm—Burns, Doane, Swecker & Mathis

[57] ABSTRACT

In a mobile cellular radio system, load balancing is achieved by moving dynamically the borders between any two cells such that an overloaded cell becomes smaller and the neighboring cell larger. This is achieved by lowering the entering signal strength threshold for handoff to the neighboring cell and/or increasing the entering signal strength threshold for handoff from the neighboring cell. Thresholds are unique for any two cells.

7 Claims, 4 Drawing Sheets

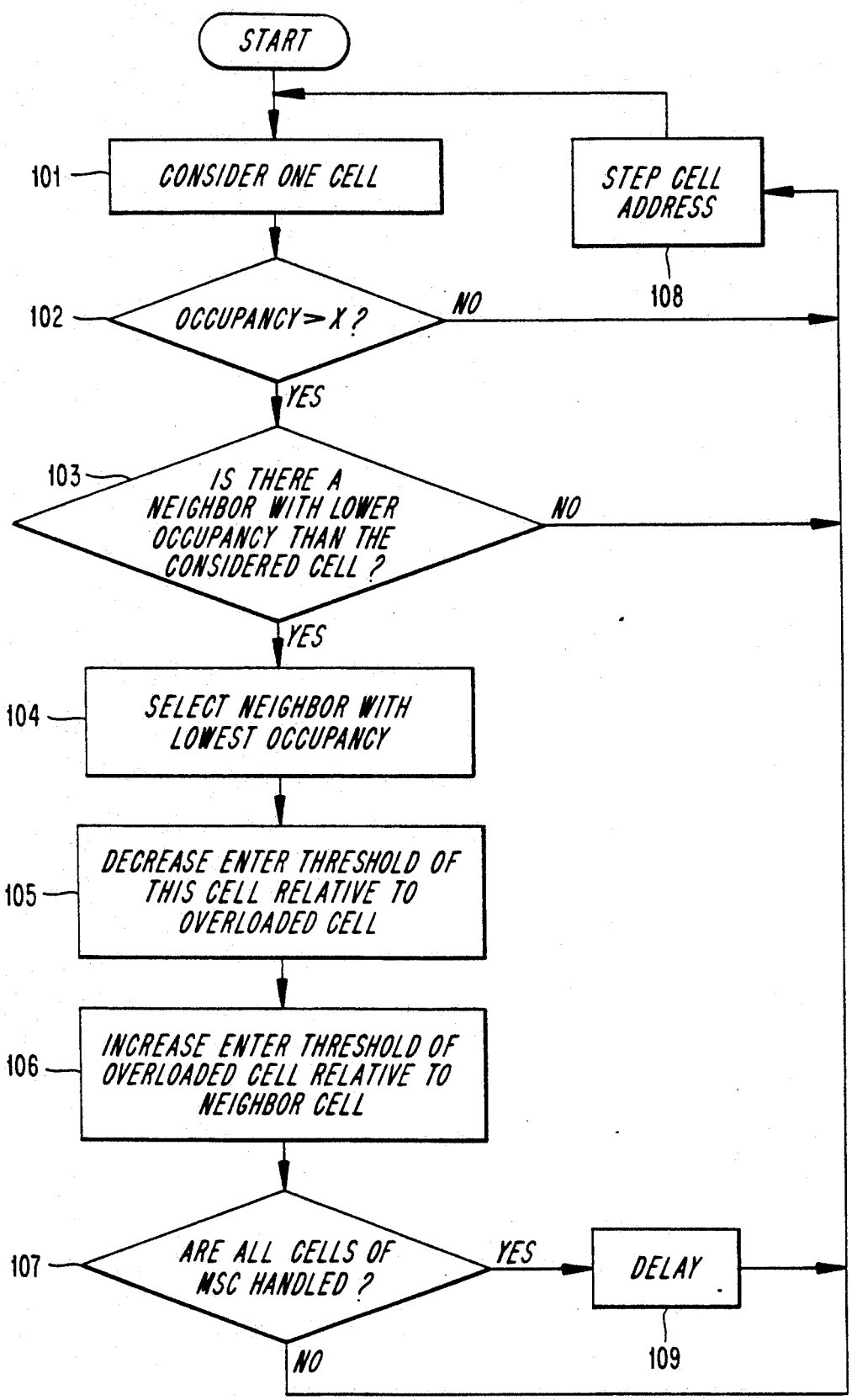

LOAD SHARING CONTROL FOR A MOBILE CELLULAR RADIO SYSTEM

FIELD OF THE INVENTION

The present invention relates generally to cellular mobile radio systems having channels for transmitting information between base stations and mobile stations. More precisely, the invention relates to a method of changing the size and shape of cells in order to reduce traffic in overloaded cells and increase traffic in less loaded cells.

BACKGROUND OF THE INVENTION

In cellular mobile radio systems it is fundamental that a mobile station with an established connection on a radio channel shall be able to maintain the established connection when moving from one cell serviced by a base station to another cell serviced by another base station. It is also highly desirable that the mobile station with an established connection on a radio channel shall be able to maintain the established connection when moving within the same cell and when the radio channel which is used is subject to increased interference. The process by which a mobile station can maintain an established connection when moving in a cellular radio system is generally called a handoff.

In general, radio communication is only possible when the desired information-carrying radio signals have sufficient signal strength at the receiver and are sufficiently strong relative to the noise and interfering radio signals at the receiver. The minimum strength, of course, depends on the particular features of the system, e.g. the kind of modulation and the type of receiver. In order to ensure that the established connection may continue on an intended radio channel between a mobile station and an intended base station, the handoff process includes measurements of the parameters of the radio signals at the intended base station and/or at the mobile station.

The first cellular mobile systems placed in public use were analog systems typically used for speech or other types of analog information. These systems include multiple radio channels for transmitting analog information between base and mobile stations by transmitting analog modulated radio signals. In general, the first cellular mobile radio systems had relatively large cells, and the signal measurements in the handoff process in such systems were performed by the base station. One such system is the Nordic Mobile Telephone System NMT 450. Another known cellular mobile radio system is the AMPS Mobile Radio System in the United States. An excellent general description of a mobile cellular radio system can be found in a publication entitled "CMS 88 Cellular Mobile Telephone System" published by Ericsson Telecom AB, 1988. The rapidly increasing usage of these mobile radio systems often causes the cells to be utilized at maximum capacity.

A method of balancing the load among cells which are operating at maximum capacity is described in U.S. Pat. No. 4,670,899, by Brody, et al., and entitled "Load Balancing for Cellular Radio Telephone System". The aforementioned patent describes a load balancing technique for a cellular telephone system. The loading of the various cells is dynamically redistributed by selectively transferring ongoing calls to adjacent cells in accordance with traffic levels in order to reserve channels for handoffs and for new calls. A channel occupancy level for a cell is periodically determined by comparing the number of channels utilized to the number of channels available within the cell. Consequently, calls are handed off before all the channels are utilized, thereby allowing at least one or more channels to be reserved for new or incoming calls.

According to the Brody et al. patent, if there is a mobile unit on the periphery of the cell which is also within the range of a neighboring cell, the unit on the periphery will be ordered to transfer to the neighboring cell in order to make room for a new call or a mobile station entering the cell and engaged in an ongoing call. This procedures has two disadvantages. Firstly, it provides traffic based control of handoffs out of a cell, but there is no equivalent control of handoffs into a cell. Secondly, it creates a complex system, with handoffs due to load balancing being handled differently from handoffs due to mobile stations leaving the cell.

Another prior art system is disclosed in U.S. Pat. No. 4,435,840 by Kojima et al., and entitled "Radio Mobile Communication System Wherein Probability of Loss of Calls is Reduced Without a Surplus of Base Station Equipment." The aforementioned patent describes a mobile communication system in which the service area of a base station is narrowed by reducing the base station output power. Alternatively, the mobile station output power may be increased, or the base station reference level for call set-up may be varied. The disclosure of the Kojima et al. patent does not discuss the manner in which the handing off of established calls takes place.

SUMMARY OF THE INVENTION

The present invention overcomes the shortcomings of the prior art by dynamically adjusting signal strength thresholds of the various cells in a cellular telephone system to balance traffic. Mobile stations are not ordered to handoff to neighbor cells, but the parameters governing the normal handoff procedures are modified. By adjusting the signal strength thresholds, which are designed to be individual or unique between any two cells (one cell may have as many thresholds as it has neighbor cells), the present invention can effectively increase and decrease the distance from the base station to all sides of the cell. By changing the distance to the sides of the cell, the system can change cell shapes in order to increase or decrease the use of available voice channels in cells which are adjacent to each other.

According to the present invention, the loads in neighboring cells are balanced by dynamically adjusting the signal strength thresholds which are individual for the relationship between any two cells. When a cell is being overloaded, the system determines whether there are any not overloaded neighboring cells and which of the cells is least loaded. If such a cell exists, the signal strength threshold of the overloaded cell in the direction from this neighboring cell is increased, and/or the signal strength threshold of the neighboring cell in the direction from the overloaded cell is decreased. By dynamically varying the thresholds, the effective areas of the cells are either increased or decreased and the cell shapes changed. The effective area of the overloaded cell is decreased to a point such that fewer mobile stations are handled in the overloaded cell and a higher number of mobile stations is handled in neighboring cells. The dynamic adjustment of cell sizes and shapes increases traffic capacity and facilitates the load balancing of calls within the mobile cellular radio system.

BRIEF DESCRIPTION OF THE DRAWING

FIG. 4 illustrates a flow chart of a subroutine utilized by the computer of a mobile switching center in accordance with the present invention.

DETAILED DESCRIPTION

Figure 1:
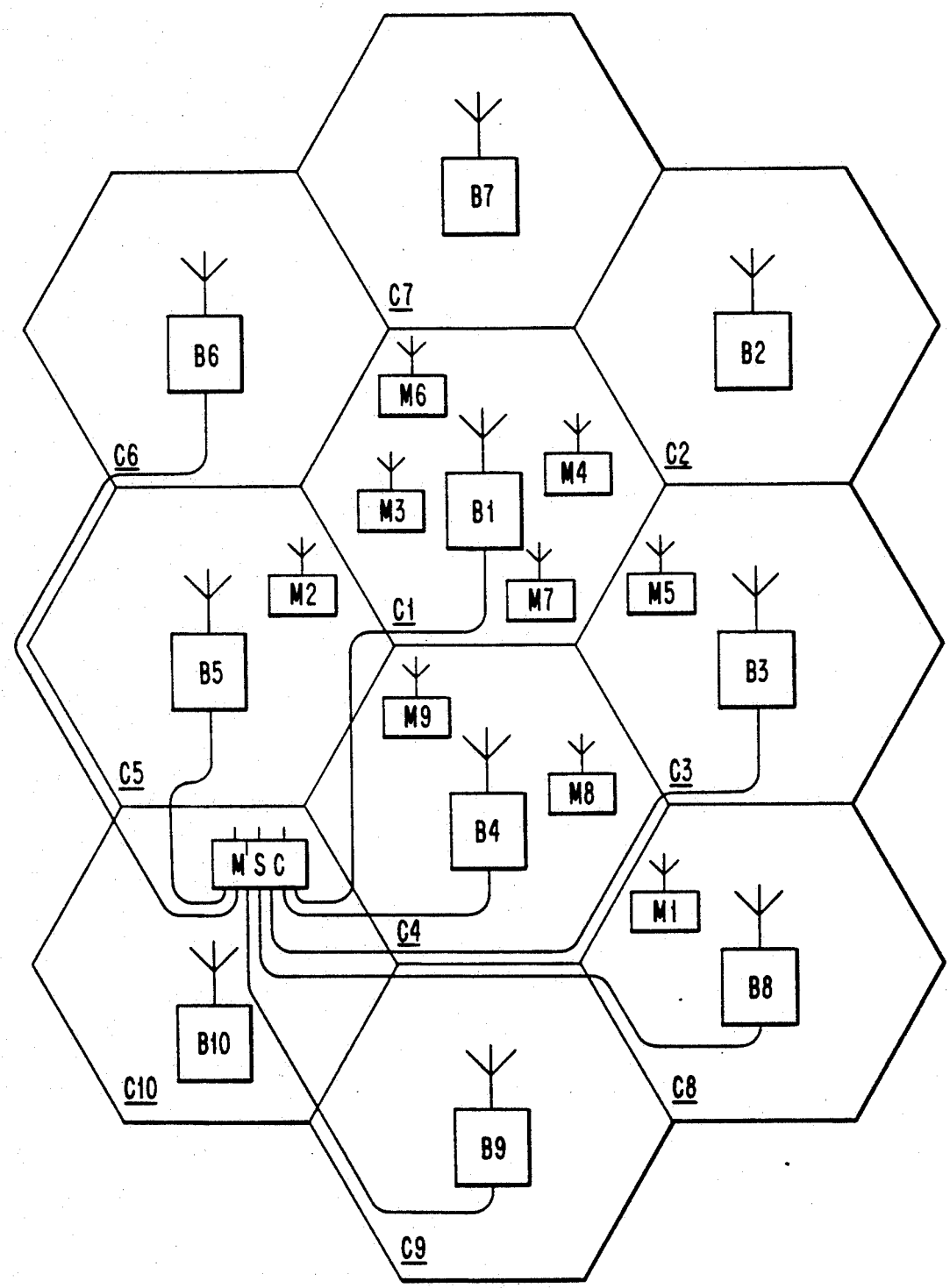
FIG. 1 illustrates a portion of a cellular mobile radio system having cells, a mobile switching center, base stations and mobile stations.

FIG. 1 illustrates ten cells, C1-C10, in a cellular mobile radio system. Normally a cellular mobile radio system according to the present invention would be implemented with more than ten cells. However, for the purposes of simplicity, the present invention can be explained using the simplified representation illustrated in FIG. 1.

For each cell C1-C10, there is a base station B1-B10 with the same reference number as the corresponding cell. FIG. 1 illustrates the base stations as situated in the vicinity of the cell center and having omni-directional antennas. The cells C1-C1O are, therefore, schematically represented as hexagons. The base stations of adjacent cells may, however, be co-located in the vicinity of cell borders and have directional antennas as is well known to those skilled in the art.

FIG. 1 also illustrates nine mobile stations M1-M9, moveable within a cell and from one cell to another. In a typical cellular radio system there would normally be more than nine cellular mobile stations. In fact, there are typically many times the number of mobile stations as there are base stations. However, for the purpose of explaining the invention, the reduced number of mobile stations is sufficient.

Also illustrated in FIG. 1 is a mobile switching center MSC. The mobile switching center MSC illustrated in FIG. 1 is connected to all ten base stations B1-B10 by cables. The mobile switching center MSC is also connected by cables to a fixed public switching telephone network or similar fixed network. All cables from the mobile switching center MSC to the base station B1-B10 and cables to the fixed network are not illustrated.

In addition to the mobile switching center MSC illustrated, there may be another mobile switching center connected by cables to base stations other than those illustrated in FIG. 1. Instead of cables, other means, for example, fixed radio links may be used for connecting base stations B1-B10 to the mobile switching center MSC. The mobile switching center MSC, the base stations B1-B10, and the mobile stations M1-M9 are all computer controlled.

The cellular mobile radio system illustrated in FIG. 1 includes a plurality of radio channels for communication. Such systems can be designed for either analog information or digital information, and the present invention is applicable to either analog or digital systems, but in the following description an analog system is assumed. Some of the radio channels are used for control channels, and each base station B1-B10 has at least one control channel. Normally a control channel is not used for the transfer of speech information. Control channels are typically used for monitoring and controlling mobile stations during the set up of a connection and during the registration of a mobile, (i.e. when the mobile reports to the land system in which it is located).

Each cell is always equipped with a signal strength receiver which consists of a receiver and a control unit. The signal strength receiver is typically the same design as the receiver used for each voice channel. The signal strength receiver in each cell performs cyclical measurements, sampling the radio frequencies received from the mobile stations. All the system frequencies may be sampled but only the voice channel frequencies allocated to mobile stations in the neighboring cells are of interest for handoff. The information about which channel should be taken under consideration, during the above-mentioned sampling is originally received from the MSC. The measurement results are updated, in the control unit as a mean value after each cyclic sampling. In this way each cell knows what the signal strength with any mobile station currently using a neighbor's voice channel would be if the cell in question would have to take over the transmission. If a handoff has been requested by a cell, the MSC will ask the neighboring cell to send the measurement results of the signal strength from the mobile station.

During a call in progress, voice channel equipment in each of the base stations B1-B10 continuously supervises the radio transmission parameters. Each voice channel unit performs continuous measurements of the received signal strength on its own radio frequency. The control unit evaluates these measurement results against threshold values which are command initiated parameters that are stored in the control units of each voice channel. A signal strength threshold value for handoff requests, SSH, is set by command for each cell. When the value of a signal coming from a mobile station falls below the SSH threshold value which indicates poor transmission quality, the mobile station is considered for handoff to a neighboring cell.

According to the present invention, there is a first threshold for a mobile station entering its cell from another cell, and a second threshold for mobile stations that are on established calls within the cell. The first of these thresholds is used to determine whether a mobile station whose call is being handled in another cell should be handed off to the cell of interest, and is hereinafter referred to as the entering threshold. The second threshold is used to determine whether the signal strength of a mobile station within the cell is sufficient to continue to handle the call from within the cell, or whether the call should be handed off to another cell, and is referred to as the staying threshold. The staying threshold is also referred to herein as the SSH threshold. Whether the mobile station is actually handed off depends upon a comparison of the entering threshold to the difference between the mobile station's measured signal strength at its present cell and its neighboring cells. The threshold values may be varied dynamically in accordance with the present invention.

The voice channel unit in a base station will notify the MSC of a signal strength below the staying or SSH threshold value by sending a handoff request typically every 10 seconds during this condition. The handoff request message contains the current value of the signal strength from the mobile station. The handoff request indicates that another cell with better reception should be located for taking over the transmission.

The signal strength results are always available in each cell. On request they will be provided to the MSC which looks for the best result. When the measured signal strength satisfies the dynamically variable entering threshold, the MSC can then determine the target cell for handoff. When the cell is determined, the MSC looks for an idle voice channel in the cell. If all the voice channels are busy at the moment, the next best cell is taken providing that it also fulfills the criteria. When the voice channel has been selected an order to start the transmitter in the base station is issued to the new cell. Then an order to the mobile station for turning to the selected voice channel is sent. The base station in the new cell and the mobile station can then communicate with one another.

Figure 2:
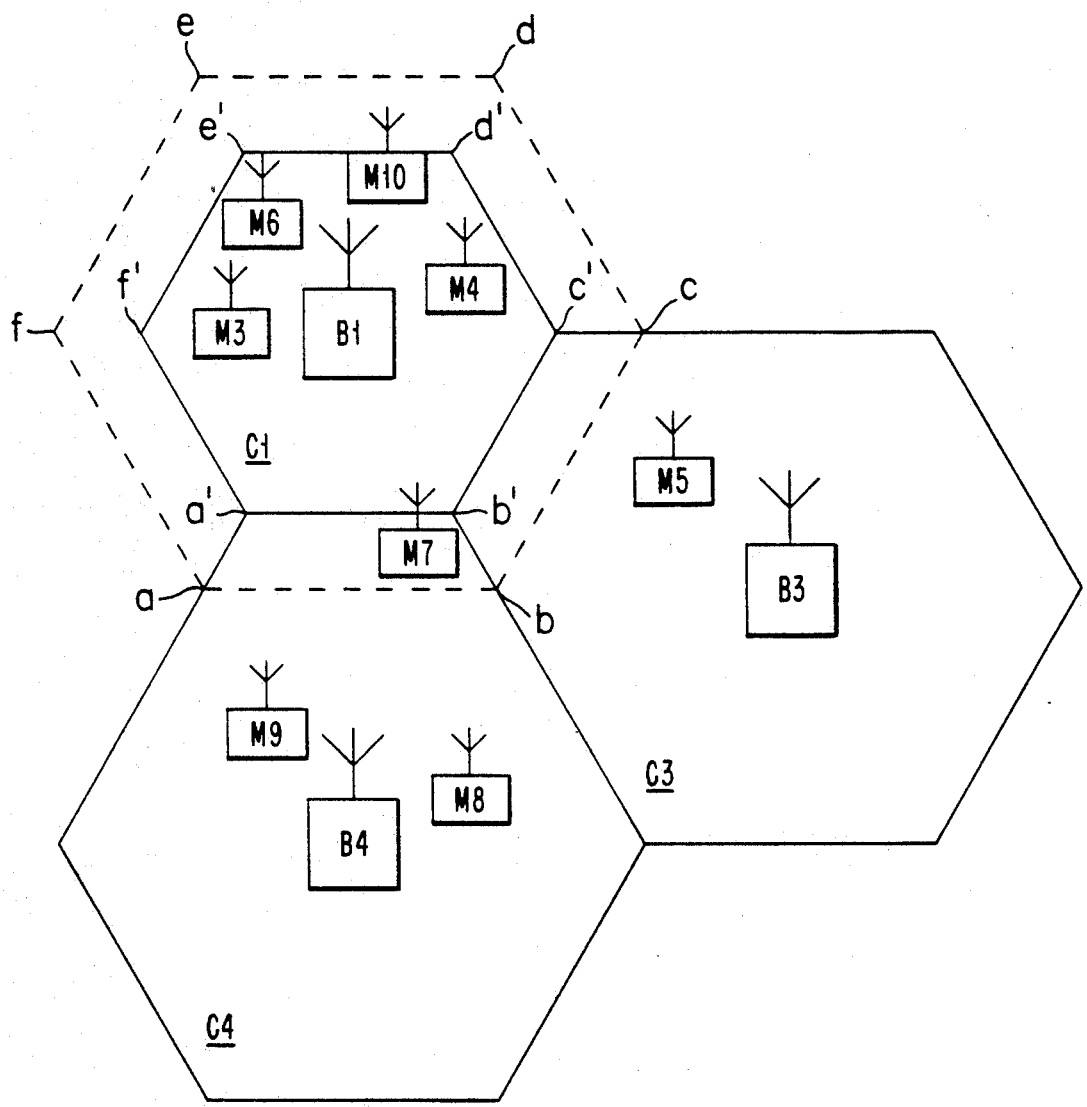
FIG. 2 illustrates an enlarged portion of FIG. 1 in which the effective cell sizes have been varied by dynamically varying the signal strength thresholds.

Referring now to FIG. 2. an enlarged illustration of the cells C1, C3, C4 is provided. For the purposes of explaining the present invention, cells C1, C3, C4 are described as having a control channel and four voice channels. Each base station B1, B3 and B4 is capable of simultaneously servicing four mobile stations at one time. In an actual cellular system a base station could typically handle more than four voice channels.

Referring back to FIG. 1, it can be appreciated that cell C1 and base station B1 are servicing four mobile stations M3, M4, M6 and M7 simultaneously. Cell C3 and base station B3 are servicing mobile station M5. Cell C4 and base station B4 are servicing mobile stations M9 and M8. Returning again to FIG. 2, a problem arises, however, in cell C1 when mobile station M10 requests access to the base station B1. Such a situation can arise, for example, if a driver in cell C1 enters his automobile and attempts to initiate a call. Once activated, mobile station M10 requests access to cell C1 over the control channel operating from base station B1. Since cell C1 and base station B1 are only capable of servicing four mobile stations with their four voice channels, it is not possible for mobile station M10 to gain access to the system unless one of the voice channels in cell C1 is vacated.

According to the present invention as illustrated in FIG. 2, a voice channel in cell C1 may be vacated and access can be given to the mobile station M10 by reducing the size of cell C1. By dynamically varying the entering thresholds of cells C1 and C4, the sizes of cells C1 and C4 are decreased and increased respectively. The SSH threshold (the staying threshold) is an absolute value. It is only used to limit the amount of handoff processing. It is of no importance functionally since it is always above the absolute values associated with the entering thresholds. The mobile station M7 formerly at the periphery of cell C1 now lies within the expanded area of cell C4 and can be handed off by the normal handoff routine. Typically in the prior art, the entering thresholds between cell C1 and its six neighboring cells C2-C7 are the same and a handoff usually occurs when the signal strength satisfies the entering threshold. In the present invention, however, the entering thresholds between cell C1 and each cell C2-C7 may be different and the mobile station is not handed off until the entering threshold is exceeded as hereinafter explained. Moreover, in the prior art the entering threshold for a mobile station entering cell C1 from cell C2 (in FIG. 1) would typically be the same as the entering threshold of a mobile station entering from cell C4. In the present invention, however, there is an entering threshold for mobile stations entering cell C1 from cell C2, and this entering threshold may be different from the entering threshold for mobile stations entering cell C1 from cell C4.

According to the present invention, the handoff of mobile station M7 is made possible by a change in the effective cell size of cells C1, C4. For example, the original cell size of cell C1 is defined by the hexagon having an outer perimeter defined by points a-f. The effective area of cell C1 is a function of the entering thresholds associated with its neighboring cells. Higher entering thresholds of neighboring cells result in a larger effective area for cell C1, because the cell is capable of servicing lower power signals at greater distances from the base station. Lower entering thresholds of neighboring cells conversely result in a smaller effective cell area for cell C1, since mobile stations can be handed off at shorter distances from the base station B1. If the entering thresholds for the cell C1 are also dynamically increased, the effective area of cell C1 is reduced because this makes it more difficult for mobiles in neighboring cells to enter cell C1. Accordingly, the new effective area of cell C1 may be defined by the points a'-f' either by decreasing the entering thresholds of the neighboring cells or by increasing the entering thresholds of cell C1. The entering thresholds of the neighboring cells and the entering thresholds of cell C1 may be varied either independently or simultaneously. The effective area of cell C4 is increased if the entering threshold of cell C4 is selectively decreased or the entering threshold of cell C1 is increased. The boundary between cells C1 and C4 can be effectively shifted from boundary line a-b to the new boundary line a'-b'. By dynamically varying (decreasing) the entering threshold of the cell C4, mobile station M7 now lies within the effective cell area of cell C4. Base station B1, therefore, can effect a handoff to base station B4, thereby vacating one of the voice channels available within the cell C1. By dynamically varying (increasing) the entering threshold of the cell C1, mobile station M7 is not affected immediately, but the traffic in cell C1 is decreased after a time, because fewer mobiles are handed off from cell C4 to cell C1.

In FIG. 2 the thresholds between cell C1 and its six neighboring cells C2-C7 have all been changed by the same amount such that cell C1 retains its original hexagonal shape, but it is reduced in size. If only the thresholds between cell C1 and cells C3 and C4 had been changed, cell C1 would not have retained its hexagonal shape. Instead, cell C1 would be defined by the points a', b', c', c, d, e, f, a.

Figure 3A:
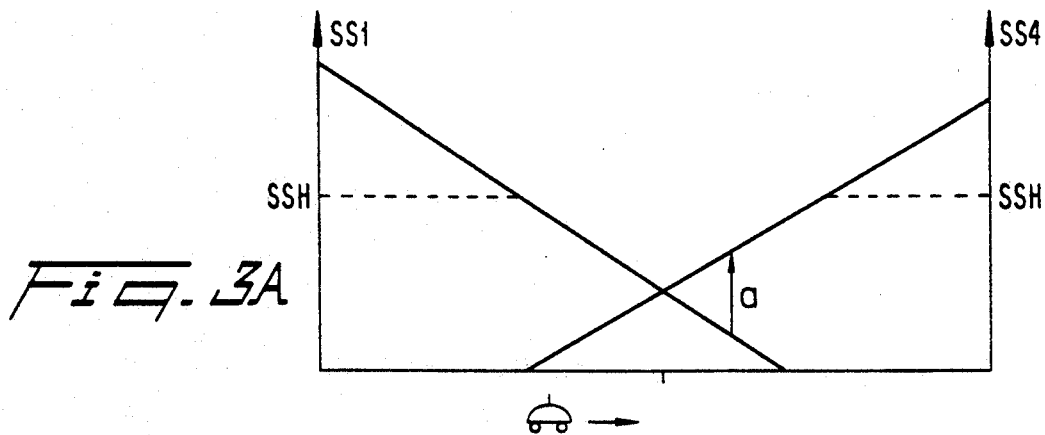
FIGS. 3A, 3B, and 3C are charts illustrating relationships between neighboring cells.
Figure 3B:
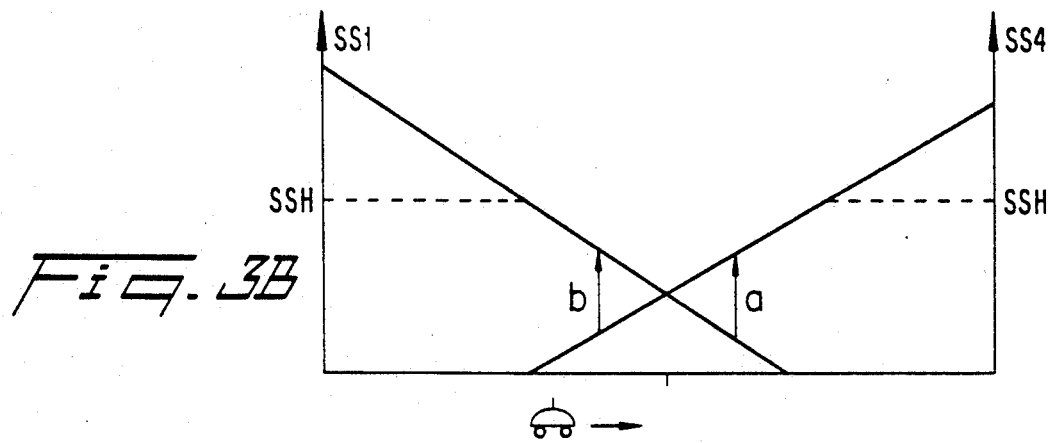
Figure 3C:
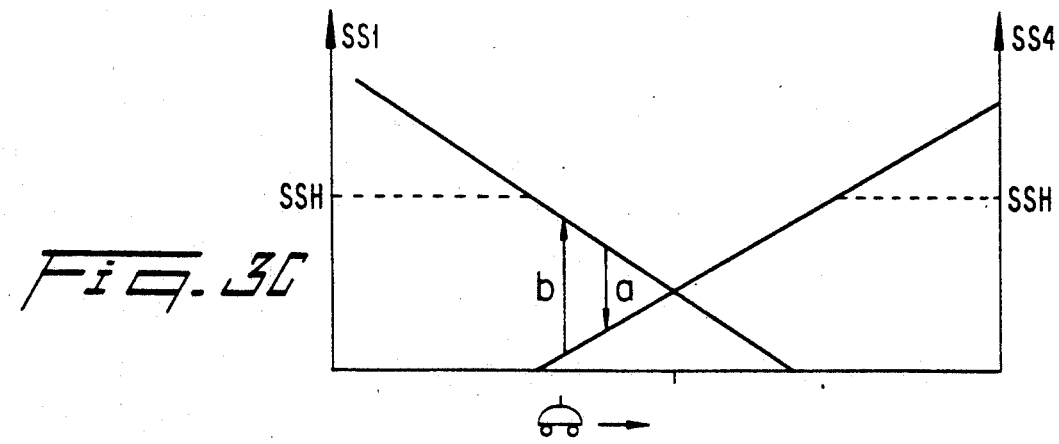

Referring now to FIGS. 3A, 3B, and 3C three charts illustrate how the entering thresholds may be dynamically varied to practice the present invention. The charts each include two vertical axes labeled SS1 and SS4 and a horizontal axis which is representative of the distance between the two base stations B1 and B4. B1 is the location of base station B1, and B4 is the location of base station B4. The sloping line originating at the SS1 axis is representative of the signal strength of signals received by the base station B1 from the mobile stations and vice-versa, measured at various distances. The actual slope of the line is not linear, but for the purposes of simplicity it is illustrated as being straight. The opposite sloping line originating at the SS4 axis is representative of the strength of signals received by the base station B4 from the mobile stations and vice-versa. The dotted line SSH is the signal strength threshold below which a mobile station is considered for a handoff. The arrows "b" and "a" represent the entering thresholds for base stations B1 and B4 respectively.

In FIG. 3A, the entering signal strength threshold of cell C4 in the direction of cell C4 is represented by the value "a" which is depicted by an arrow representing the difference between SS4–SS1. FIG. 3 illustrates an example of a method for dynamically varying the handoff thresholds in accordance with the present invention. In FIG. 3A, when a mobile station, which is pictorially represented as an automobile, moves from base station B1 to B4, a handoff is considered once the measured signal strength drops below the staying or SSH threshold, and the handoff is granted when $SS4-SS1 \geq a$. In other words, the handoff from cell C1 to cell C4 is delayed until the signal strength measured at base station B4 is greater than the signal strength measured at base station B1, as indicated by the value "a". The measurements may alternatively be performed downlink in the mobile if mobile-assisted handoff is available.

The staying threshold is the signal strength threshold that is used to determine whether an established call should continue to be handled by its present base station, i.e. whether the call should "stay" within the cell. For cell C1, this threshold corresponds to the SSH value. The entering threshold is the difference between signal strengths measured at current and target base stations. Thus, in FIGS. 3A, the enter threshold for cell C4 is "a". When a mobile is travelling from base station B1 toward base station B4, the first threshold that comes into play is SSH. When the signal from the mobile station falls below SSH at base station B1, a handoff is requested. The request is repeated typically every 10 seconds, as long as the signal strength is below SSH. At that point, the difference between SS4 and SS1 is determined, and if it is greater than "a" the handoff is carried out. In this situation, the enter threshold "b" of cell C1 is not considered. The entering threshold is the difference between signal strengths measured at the current and target base stations.

Referring now to FIG. 3B, the enter threshold of cell C1 is represented by a value "b" which is depicted by an arrow representing the difference between SS1 and SS4. When driving in the direction from base station B4 toward base station B1, a handoff is considered when the measured signal drops below the SSH threshold, but it is not granted until the measured signal strengths are defined by the equation $SS1-SS4 \geq b$.

In the example illustrated in FIG. 3C, the entering thresholds for cells C1 and C4 have been dynamically varied. It should be noted that it is possible for an entering threshold to be negative as in the case for the threshold in FIG. 3C which is represented by the downwardly pointing value "a".

The handoff of mobile station M7 from cell C1 to cell C4 in FIG. 1 is made possible by dynamically varying the thresholds of the cells by modifying the software of the computers in the MSC used to control the base stations B1, B4. The present invention can be practiced by adding subroutines to the software processed by the computers within the system.

In the description of the invention using FIG. 2 it has so far been assumed that the dynamic changing of thresholds is initiated at the instant when congestion occurs in a cell. However, in actual systems the change of thresholds is initiated earlier at predetermined load conditions of the cells.

For example, when the number of voice channels used in cell C1, divided by the total number of voice channels available in that cell exceeds 0.9 this may lead to an attempt to reduce the cell size of C1 by changing involved enter thresholds. The cell C1 has neighbors C2 ... C7 and the question is which neighbor(s) to select for the desired change of thresholds.

According to the present invention, it is possible to decrease the enter threshold of all neighbors C2 ... C7 relative to cell C1 and to increase the enter thresholds of cell C1 relative to all its neighbors, thus maintaining the base station of cell C1 in the middle of this cell. However, according to the invention, it is alternatively possible to consider the traffic occupation level of the cells C2 ... C7. If, e.g., the cell C4 has a comparatively low traffic occupation level, the enter threshold is lowered only for this cell C4 relative to cell C1 and the enter threshold rises only for cell C1 relative to cell C4. In this case the base station B4 of cell C4 will not be in the center of its cell anymore. It is even conceivable that a cell is reduced in size on one side and increased in size on the opposite side, thus displacing the cell towards a region of higher traffic, in order to help carry that traffic.

One advantage of this method is the fact that no handoff order needs to be given to any mobiles as a result of heavy traffic in certain cells, but the conditions for handoff are changed such that normal handoff activity will redistribute traffic more evenly.

The operation of the present invention can be best explained in connection with the flow chart of FIG. 4. Referring now to FIG. 4, a simplified flow chart illustrates the subroutine or modifications necessary to the software of the MSC in order to practice the present invention. One cell in the area of the MSC is addressed (101). If the occupancy level is lower than the critical value X, (102) no action is taken and the next cell is handled by stepping to the address of the considered cell (108). But if the occupancy level of the considered cell is higher than the critical value X, the flow continues down to 103. If there are no neighbor cells with lower occupancy than the previous considered cell, no action is taken and the flow continues at step 108. If however, cells with lower occupancy are available the flow continues to step 104. At step 104 a neighboring cell with the lowest occupancy level is selected and at steps 105 and 106 the entering thresholds are adjusted. At step 105 the entering threshold of the considered neighboring cell when coming from the overloaded cell is lowered. At step 106 the entering threshold of the overloaded cell relative to the considered neighboring cell is increased. Then, at step 107 it is checked whether all cells belonging to this MSC have been handled. If not, the flow continues at step 108 in order to handle remaining cells. If all cells have been handled a delay 109 is performed, in order to provide a pause until a new series of checks on the load condition of all cells of the MSC is initiated.

In the flow chart of FIG. 4 a procedure has been described which provides an adaptive adjustment of the borders between cells, depending on the varying load. However, the thresholds must not be adjusted beyond a certain limit in order not to cause the base station to be excessively out of the center of the cell. For simplicity this limiting function has not been included in the flow chart.

While the invention has been described in its preferred embodiment, it is to be understood that the words that have been used are words of description rather than of limitation and that changes within the purview of the appended claims may be made without departing from the true scope and spirit of the invention in its broader aspects.

We claim:

1. A method to achieve a load sharing between a first cell and a second cell adjacent to said first cell in a cellular mobile radio system where each of said cells is serving a number of mobile station, said first cell having a predetermined entering threshold which is a function of the received signal strength for mobile stations entering this cell from said second adjacent cell by means of handoff, and a certain occupancy level indicating the occupied channels in relation to the available channels in the cell, said method including:
   a) determining the occupancy level of said first and said second cells,
   b) determining whether said second cell has a lower occupancy level than said first cell,
   c) determining an entering threshold level for said second cell which is a function of the received signal strength for mobile stations in said first cell about to enter said second cell, and
   d) decreasing said entering threshold for said second cell if the occupancy level of the second cell is found to be lower than the occupancy level of said first cell, thereby dynamically changing the border between said first and second cell.

2. A method to achieve a load sharing between a first cell and a second cell adjacent to said first cell in a cellular mobile radio system where each of said cells is serving a number of mobile stations, said first cell having a predetermined entering threshold which is a function of received signal strength for mobile stations entering this cell from said second adjacent cell by means of handoff, and a certain occupancy level indicating the occupied channels in relation to the available channels in the cell, said method including:
   a) determining the occupancy level of said first and said second cell,
   b) determining whether said second cell has a lower occupancy level than said first cell,
   c) determining an entering threshold level for said second cell which is a function of received signal strength for mobile stations in said first cell about to enter said second cell, and
   d) increasing said entering threshold for said first cell if the occupancy level of the second cell is found to be lower than the occupancy level of said first cell, thereby dynamically changing the border between said first and second cell.

3. A method as claimed in claim 1, wherein the occupancy level of said second cell is lower than in said first cell and wherein the entering threshold of said first cell is increased in connection with said decreasing of the entering threshold of said second cell.

4. A method as claimed in claim 1, wherein said entering threshold is determined as a difference value of a first signal strength from a mobile station as received by a base station in said first cell and a second signal strength as received by a base station in said second cell, said first signal strength being less than said second signal strength.

5. A method as claimed in claim 1, wherein said entering threshold is determined as a difference value of a first signal strength from a mobile station as received by a base station in said first cell and a second signal strength as received by a base station in said second cell, said first signal strength being greater than said second signal strength.

6. A method to achieve a load sharing between a first cell and a plurality of neighboring cells in a cellular mobile radio system, where each of said cells is serving a number of mobile stations, and each cell having a predetermined entering signal threshold value which is a function of the received signal strength of mobile stations entering this cell from said first cell by means of handoff and each of the cells having a certain occupancy level indicating the occupied channels in relation to the available channels in the respective cell, said method including:
   a) determining the occupancy level of said first cell;
   b) determining whether each of said plurality of neighboring cells has an occupancy level less than the occupancy level of said first cell,
   c) selecting those cells of said plurality of cells which have a lower occupancy level than said first cell, and
   d) decreasing the entering threshold level which is a function of the received signal strength of said selected cells which have a lower occupancy level than said first cell, thereby dynamically changing the border of said first cell.

7. A method as claimed in claim 6, wherein among said selected cells which have a lower occupancy level, the cell which has the lowest occupancy level is selected, and the entering threshold level of this selected cell is decreased.

* * * * *